United States Patent [19]

Foret

[11] 4,381,833

[45] May 3, 1983

[54] FLUID-OPERATED CLUTCH AND BRAKE DEVICES

[75] Inventor: Pierre G. Foret, Falmouth, Mass.

[73] Assignee: Foret Systems, Inc., Falmouth, Mass.

[21] Appl. No.: 169,411

[22] Filed: Jul. 16, 1980

[51] Int. Cl.³ .............................................. F16D 25/04
[52] U.S. Cl. .............................. 192/85 V; 192/12 C;
192/88 A; 192/107 M; 188/73.2; 188/356
[58] Field of Search ............. 192/107 M, 85 V, 88 A,
192/70.14, 18 A, 12 C; 188/218 XL, 356, 357,
72.1, 73.2

[56] References Cited

U.S. PATENT DOCUMENTS

| | | | |
|---|---|---|---|
| 3,378,121 | 4/1968 | Foret | 192/18 A |
| 3,407,912 | 10/1968 | Moore | 192/88 A |
| 3,651,909 | 3/1972 | Zautaszwili | 192/88 A |

Primary Examiner—George H. Krizmanich
Attorney, Agent, or Firm—Wolf, Greenfield & Sacks

[57] ABSTRACT

An improved coupling disk and friction ring arrangement provides for long life, high speed operation of clutches and/or brake devices operated by fluid pressure as in vacuum operated clutch and/or brake devices. The improved coupling disk has stepped ring-shaped portions tapering to a minimal outer annular disk portion having greatest flexibility in the overall flexible disk. The outer portion contacts a friction ring to seal a gap therebetween and provide coupling between an axle on which the disk is mounted and a housing to give either clutch or brake output. The friction ring acts in coupling with the disk while an encircling peripheral annular portion of the disk provides a leakage gap of constant predetermined value unaffected by wear in the disk or friction material. Preferably the gap is formed by burnishing the friction material using the eccentricity of the disk to define a minimum gap. The gap has a size such as to provide a block to leakage air flow.

6 Claims, 3 Drawing Figures

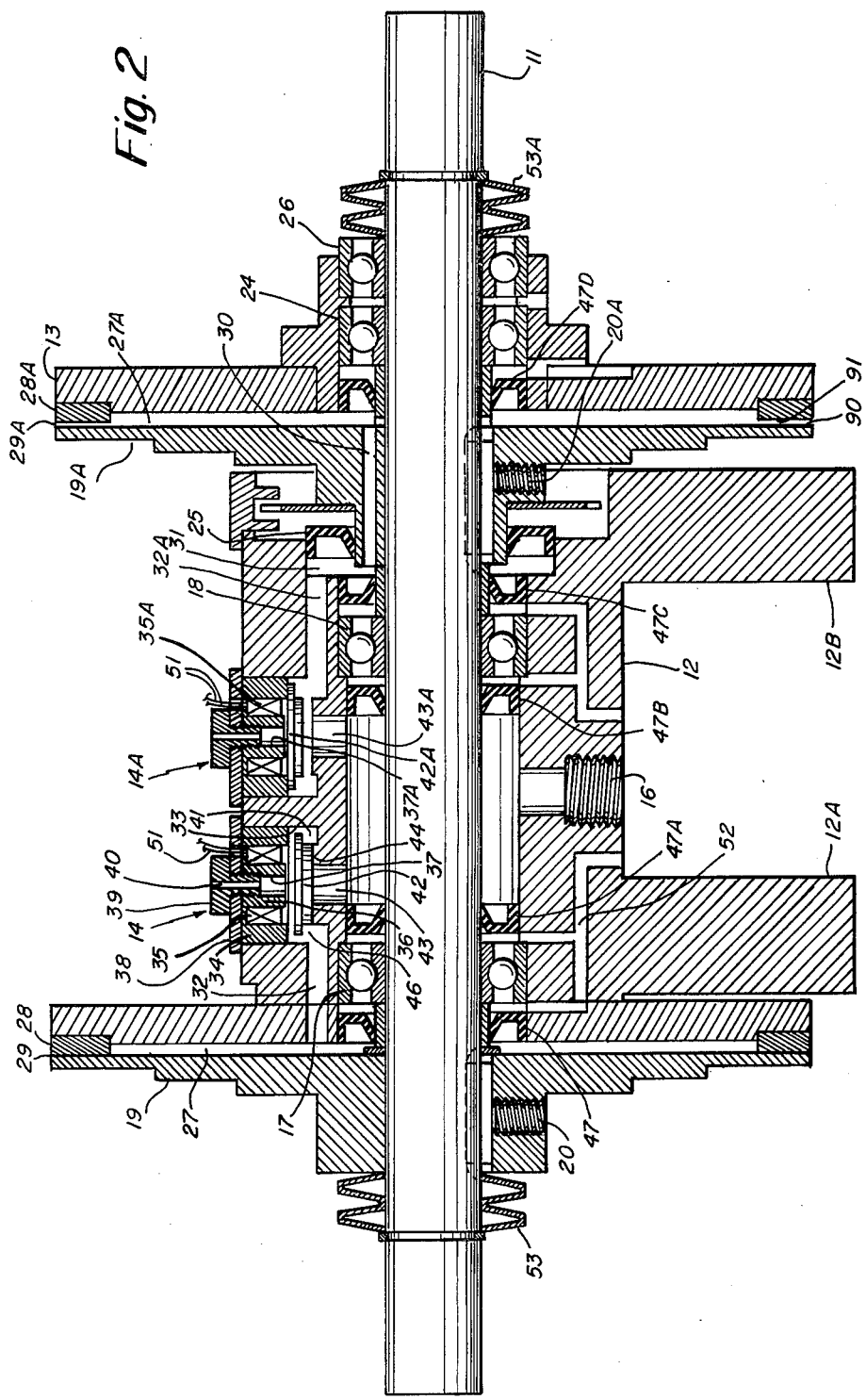

FLUID-OPERATED CLUTCH AND BRAKE DEVICES

BACKGROUND OF THE INVENTION

This is an improvement in fluid-operated clutch and/or brake devices of the type described in U.S. Pat. No. 3,378,121. That patent discloses vacuum-operated clutch and brake devices with magnetic valves having extremely fast actuation time with extremely fast switching time in both clutch and brake constructions. Clutch and brake devices in accordance with that patent have many advantages over prior art clutch brakes. Such vacuum-operated clutch and brake devices while having outstanding value, do have certain limitations. It is known that as the thin flat disks used for clutching or braking are increased in diameters, problems such as disk buckling during manufacturing, cracking at the disk hub during torque transmission and partial disk collapsing can occur. These problems can occur since increasing the diameter of the disk by a factor of 2 results in increasing the acting pneumatic force on the disk by a factor of 4 and the torque by a factor of 8. The disk inertia increases as the 4th power of the diameter. As a result, the flat disk described in U.S. Pat. No. 3,378,121 is best for small disks, generally not exceeding 8" diameter.

The leakage gap between the coupling disk and friction pad of the prior art as shown in said U.S. Pat. No. 3,378,121 can vary with distortion of the disk as well as by wearing away of friction material with repeated usage. It is desirable to increase the advantageous properties of the prior art by providing constructions which avoid wear-related variation in response, are formed by simplified methods, and which enable disks to be used which have maximum strength and flexibility for increased speed of operation, higher energy efficiency and long life.

SUMMARY OF THE INVENTION

It is an object of this invention to provide an improved coupling disk for use in a fluid-actuated coupling assembly for coupling a shaft with a friction member, which disk is strong, has consistent operation, with fast operating speeds over long lifetimes.

Another object of this invention is to provide an improved coupling disk in accordance with the preceding object which is capable of ease and relatively inexpensive manufacture by standard tooling.

Still another object of this invention is to provide a coupling disk in accordance with the preceding objects which has higher flex at an annular peripheral coupling portion than at other portions, thereby reducing stress on the disk and increasing life.

Still another object of this invention is to provide a coupling disk with high torque to inertia ratio, thereby increasing efficiency.

Still another object of this invention is to provide an air gap determining means and method for providing a constant leakage gap in a coupling disk friction ring means which gap is unaffected by wear on the disk or friction ring over long operating times so as to obtain constant operating conditions.

Still another object of this invention is to provide a minimized air gap in accordance with the preceding object to increase vacuum pump efficiency, minimize dirt contamination and decrease response time of the disk.

According to the invention, an intermittent device for clutching and/or braking rotational movement of a shaft has a housing with a shaft passing through the housing. The shaft carries a resilient disk mounted thereon and capable of flexing at an annular marginal portion thereof when a force is applied to one side thereof and elastically returning to its original unflexed condition when the force is removed. Substantially the entire disk preferably flexes to some extent but the annular marginal portion is thinner than other portions of the disk and flexes to a greater extent than the remainder of the disk.

The disk lies substantially close to the housing to define a chamber therebetween opened to the atmosphere at the periphery of the disk. An annular friction ring is mounted on the housing spaced from an annular marginal portion of the disk by an air or leakage gap and is constructed and arranged to close the chamber and couple the housing with the shaft upon flexing of the disk into contact with the annular friction ring. The disk is stepped in at least three steps with an outer annular marginal portion thereof having a thickness over a radial distance, corresponding to the area of contact with the friction ring, in a range of from 0.030 inch to about 0.187 inch and with the disk having a diameter preferably in the range of from 2 to 20 inches. Preferably means are carried in the housing for selectively creating a vacuum in the vacuum chamber to couple the shaft and housing upon electrical actuation or returning the chamber to atmospheric pressure on deactuation of the means which is preferably an electromagnetic valve.

Preferably an annular means has a concentric portion surrounding a peripheral edge of a coupling disk adjacent a friction ring portion axially spaced from the disk. The annular means provides an air gap between an annular surface thereof and an end edge of said disk preferably corresponding to a radial distance of from 0.001 to 0.004 inch. The gap is a leakage gap determining a constant value leakage area which is substantially unvaried by flexing of the disk into engagement with the friction ring. Flexing can be carried out at high speed over long operating times. Since the annular means is not contacted by the disk, and the surface of the disk which couples with the friction ring does not engage the annular means portion which forms the gap, the gap remains constant over long periods of use of the disk and friction ring under operating conditions.

The leakage gap between the concentric disk edge or peripheral wall and the annular portion which forms the air or leakage gap is preferably formed in the friction material by burnishing it with the disk using the eccentricity of the disk to form a gap of from about 0.001 to about 0.004 inch.

It is a feature of this invention that stepped disks having peripheral outer highly flexible outer annular areas provide strong disks with consistent and fast operation over long life spans. Manufacturing is simplified in that the stepped digital-type cuts in the disk can be made with standard machine tools. The feature of the annular ring surrounding the disk and along with the disk edge providing a predetermined constant leakage gap, avoids problems in gap variations. There is no wear at the gap as would happen when the friction material facing the planar face of the disk provides the gap. Thus, operation of the device is constant without erratic movement. The gap remains constant and small.

This allows greater deflection of the disk without erratic variations in the gap. Even after wear of the friction ring or pad contact surface which couples with the disk, since the gap remains the same, the operation of the device is fairly constant. For example, response can be plus or minus 300 microseconds over a long period of wear as for example, where the gap between the disk and the friction pad contact surface may change from 0.001 inch to 0.015 inch. Such wear would otherwise cause a substantial variation in response time.

Since there is no wear at the gap, and the gap is small, low leakage can be maintained thus cutting the amount of vacuum that is required to actuate the disk. Faster responses can be obtained with higher power efficiency. Since smaller gaps can be used, the entrance of pollutants through the gap can be minimized thus keeping equipment cleaner and less susceptible to dirt damage.

The use of the method of burnishing the friction ring with the disk with a resultant annular gap of from 0.001 to 0.004 simplifies manufacture. The small constant gap is responsible for substantially blocking air flow to a vacuum chamber due to turbulence.

As used in this application, the term "burnishing" means and includes a surface-polishing operation which also acts to bore-out for removal a small amount of material to form a shape as will be described.

The use of both the stepped disk feature with a thin outer marginal area and the gap determined by the annular means surrounding the edge of the disk enables significant improvement which can increase repeat accuracy by at least 100% while increasing response time by at least 100% and greatly extending the useful life of clutch and brake arrangements of the type disclosed in U.S. Pat. No. 3,378,121 by at least 50%.

BRIEF DESCRIPTION OF THE DRAWINGS

The above and other features, objects and advantages of the present invention can be better understood from a reading of the specification in conjunction with the drawings in which:

FIG. 2 is a cross-sectional view through the center thereof; and

DESCRIPTION OF PREFERRED EMBODIMENTS

Figure 1:
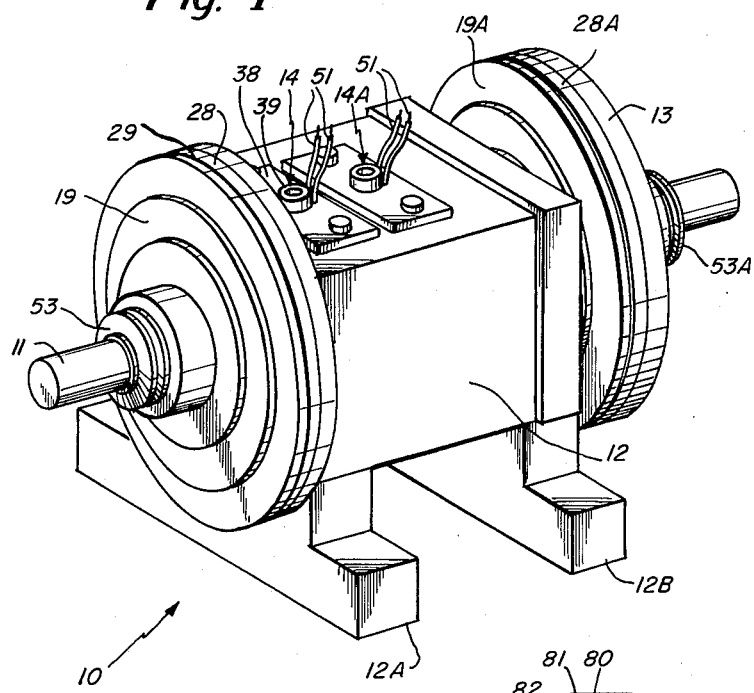
FIG. 1 is a perspective view of a preferred embodiment of this invention.

With reference now to the drawings and more particularly FIG. 1, an electro-vacuum clutch brake is illustrated at 10 having a central shaft 11 with its associated coupling assembly, a fixed housing 12, a flywheel 13 and a pair of identical actuator assemblies 14, 14a. The housing 12 is preferably generally rectangular in cross section with legs 12a, 12b for mounting the clutch brake on fixed base not shown.

A passageway 16 is preferably provided passing inwardly of the metallic housing to a preferably centrally located, freely rotatable shaft 11 mounted on conventional bearings 17 and 18 which are in turn fixed to the housing and permit free rotation of the shaft 11 independently of the housing 12. The passageway 52 provides atmospheric conditions at the sealed bearings.

The left-hand end of the housing as seen in FIG. 2 carries a thin circular stepped coupling disk 19 which acts as a coupling member in a brake construction of the clutch brake. The disk 19 is fixed at its center to the shaft 11 by means of a key and lock screw 20.

The right-hand end of the shaft 11 as seen in FIG. 2, carries the flywheel 13 rotatable thereon and which can act as a drive member for the clutch brake, as for example, when linked with a drive motor by means of a conventional pulley belt (not shown). The flywheel 13 is rotatably mounted on the shaft 11 by suitable ball bearings 24 and 26. Belleville washers resiliently maintain the shaft in position as shown at 53, 53A.

A rotary seal 25 is provided between the disk 19a and the housing 12. The rotary seal comprises a hard rubber ring 25 seated in a circular recess in the housing and forming a lip rotary seal with the shaft. The disk is mounted on the shaft by conventional key and lock screw 20a.

The right-hand end of the shaft 11 carries a coupling disk 19a mounted by identical components as used for mounting the preferably identical coupling disk 19. Similar components in the device are marked with the designation "a". A vacuum chamber 27 is provided between the disk 19 and the end of the housing 12 by an annular stepped cavity formed by the projection of annular friction ring 28 which is fixed to the housing and preferably spaced slightly from the resting plane of the disk 19. This forms an air or leakage gap 29. Similarly, a friction ring 28a and vacuum chamber 27a are provided on the flywheel at the right-hand side of the housing. The friction rings are preferably composed of hard resilient rubber and cork mixtures or known brake and clutch friction material and provide a damping effect to the coupling disk on engagement. The vacuum chamber 27a communicates with the actuator assembly 14a through a bore 30 extending through and preferably parallel to the axis of the disk 19a to a vacuum passageway of a circular recess 31. The vacuum chamber 27a communicates with the actuator assembly 14a through bore 30 throughout rotation of the disk. Similarly chamber 27 communicates with the actuator 14 through a vacuum passageway 32.

Only the brake actuator assembly 14 will be fully described in order to simplify the description since both actuator assemblies are identical and identical reference numerals refer to identical parts. The actuator assembly 14 is snugly received in airtight relationship in a suitable circular bore 33 provided in the housing 12. The actuator assemblies act as valves to switch the coupling disk 19 and 19a upon suitable electrical actuation as will later be described.

The brake valve 14 has a circular casing 34 carrying a conventional electromagnet 35 about a core 36 having a central preferably axially extending gas inlet port 37. Elements 34, 35 and 36 are fixed to a mounting plate 38 preferably by a headed bolt 39 screw threaded to the inside wall of bore 37 with the bolt 39 having a bore 40 axially aligned with the bore of gas inlet port 37. A valve chamber 41 is formed by the bore 33 of the housing 12 in conjunction with the lower end of the valve. Within the chamber 41 is positioned a flapper disk or movable closure member 42 having a diameter less than the diameter of bore 33 to provide for direct communication between the gas inlet port 37 and the vacuum passageway 32 when closure member is in the position shown in FIG. 2. Preferably the disk 42 is not in any way connected with the housing or other portions of the valve so that it is truly floating and is formed of a magnetic material such as iron or steel.

Flapper 42 has a first planar portion facing the gas inlet port 37 and a second planar portion facing a vacuum port 43 which extends to the outside of the housing through 16 for connection to a suitable vacuum supply source such as a vacuum pump. The orifice of bore 43 is effectively increased in size preferably by the use of a ring 44 having a bore axially aligned with bore 43. A notch 46 is provided to allow communication between the valve chamber and the vacuum passageway 32. Ring 44 is fixed to the housing 12.

The above components with the exception of the coupling disk, conventional ball bearings 17, 18, 24, 26, conventional rotary rubber air seals 47, 47a, 47b, 47c, 47d are substantially as described in U.S. Pat. No. 3,378,121 and said patent is incorporated by reference herein.

Electric leads 51 are provided for each valve connected to a suitable on-off electric switch (not shown) for actuating the valves.

In operation of this preferred embodiment of the electrovacuum clutch brake 10, it is shown in its moving position in FIG. 2. The flywheel 13 is connected to a drive belt or chain and with an electric motor (not shown) giving constant rotation of the flywheel. Each of the vacuum ports 43, 43a are connected with a constant vacuum source such as a vacuum pump (not shown) providing a constant vacuum, holding flapper disk 42a in the up position opposite to that shown in FIG. 2 with the clutch disk 19a actuated and vacuum in chamber 27a.

To stop the shaft 11, electromagnet 35 is actuated pulling the disk 42 against the force of the vacuum to block the air inlet 37 of the drive valve 14. This action simultaneously interconnects the vacuum port 43 with the vacuum passageway 32 and pulls air out of the vacuum chamber 27 at a faster rate than the air can enter from the periphery of the disk at the leakage gap 29 between the friction ring 28 and the rim of the disk 19 at an annular portion thereof. Note that the disk has an inner face with an annular portion adapted to mate with and contact a face of the friction ring 28 and an outer face which is stepped. Thus the coupling disk 19 is resiliently flexed from its plane by atmospheric air pressure and pulled into coupling engagement with the friction ring 28 and magnet 35a is deactuated to release the vacuum in 27a and thus release the clutch.

When it is desired to stop the shaft 11, current to the electromagnet 35a of valve 14a is stopped and it is deactuated, whereupon the force created by air pressure acting on the upper surface through the air inlet port 37a in conjunction with a vacuum created by the vacuum port 43a which pulls the flapper into position against 44a allowing air to enter behind the disk 19a and disconnecting the shaft 11 from the driving flywheel 13. The brake valve 14 can be simultaneously actuated to allow passage of electric current to electromagnet 35 raising the flapper valve 42 in the same manner against the force of the vacuum and thereby creating a vacuum in the vacuum chamber 27 and engaging disk 19 with the friction ring 28 bringing the shaft 11 to an immediate stop even though the flywheel 23 continues its rotation. Preferably a conventional electronic switch is used to simultaneously actuate the brake valve when the clutch valve is deactuated and conversely actuate the clutch valve when the brake valve is deactuated. Separate manually-actuated switches can be used if desired.

Figure 3:
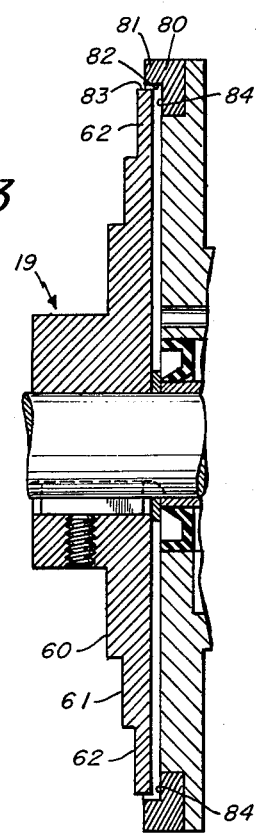
FIG. 3 is a cross-sectional view of a portion thereof similar to the left-hand end of FIG. 2 but showing an improvement therein.

The spacing of the annular disk inner surface adjacent the friction ring from the friction ring at rest as shown at the left-hand end of FIG. 2 is extremely important and forms the air gap or leakage path 29a. If this spacing can be kept constant, the cross-sectional area or gap leading to the vacuum chamber can be maintained constant and thus the most constant response maintained. In the embodiment of FIGS. 1 and 2 the air gap or leakage space between the planar surfaces of the friction ring and coupling disk is preferably about 0.001 to 0.005 inches when 4 inch diameter coupling disks of aluminum are used. The preferred embodiment for maintaining the air gap constant is shown in FIG. 3 and will be described below. The gap in FIG. 2 is preferably maintained at a spacing of from 0.001 to 0.005 inch with disk diameters of from 6 to 20 inches in order to get 90% of original torque value on the shaft when the disk deflects. This will vary with wear but does provide long life. However the air gap which is equivalent to an axial distance along the axis of the shaft 11 can be up to 0.010 inch for a 4 inch diameter coupling disk.

The size of the coupling disks varies with different power rating devices. Normally the disk has a diameter of from 4 to 20 inches. In prior art thin coupling disks, a thickness of 0.032 inch was found suitable for 4 inch diameter units and are suitable here. The coupling disk is preferably rigid and formed of materials such as aluminum and aluminum alloys which can be flexed several thousandths of an inch at their periphery by pneumatic pressure differences of for example 3 psi. Other metals and non-metals can be used. Static torques of 56 inch pounds and higher can be transmitted by prior art thin disks. The improved disks of this invention are preferably arranged in a digitally stepped configuration as shown at disk 19. Thus the disk can have a diameter of from about 4 to about 20 inches and can vary with a flexible portion 60 having a thickness of for example from 0.060 to 0.40 inch and radial distance of ⅓ of the disk radius with portion 61 having a thickness of from 0.050 to 0.250 and a radial distance ⅓ of the disk radius and the all important marginal outer annular peripheral portion 62 having a radial distance of about the remaining ⅓ and a thickness of from 0.187 inch to 0.03 inch. This provides for flexing of a substantial portion of the disk but with maximized flexing at portion 62. The force acting on the outer 30% of the radius of the coupling disk is about 70% of the disk flexing force. With valves of the type described above and as further described in the above-noted U.S. patent, the disk can be designed to deflect so that gaps can vary from 0.001 to 0.015 inch between the coupling surface 90 of the disk and 91 of the friction ring exist in the at rest position. The stepped disk of this invention provides for uniform deflection with maximized deflection at the outer marginal annular portion and enables the disk to withstand substantial stress by having stronger thicker portions at the areas of greatest stress that is intermediate the annular outer portion which seals the air gap or leakage gap and the inner hub portion. The steps in annular rings can be easily machined using conventional equipment.

In a preferred alternate embodiment of the invention, the problem involved in variation in the gap due to wear in either the coupling disk or friction material 28 is overcome. In the case of FIG. 3, variation by wearing of the friction material at the mating surface between the friction material and the disk annular outer portion does not affect the air gap. This is because the air gap is annular and surrounds the disk peripheral edge as shown in FIG. 3. The gap between the friction ring and the disk inner surface is no longer the effective air gap in this embodiment and acts only to provide a coupling gap for engaging the disk.

The friction material ring 80 in cross section has an L shape providing an end 81 of annular configuration having an annular inner surface 82 facing the annular outer surface or peripheral edge 83 of the disk 19. The annular outer surface 83 of the disk 19 provides a gap between it and the annular surface 82. That gap is constant even after repeated flexing of disk outer annular portion 62 into and out of contact with a surface 84 of the friction material. Thus, long life can be obtained with a constant gap between surfaces 82 and 83 since those surfaces do not contact each other in normal usage of the device. Thus an annular means provides a radial air gap between surfaces which do not contact and cannot wear. Predetermined desirable gap cross-sectional areas can be achieved in this manner. In the preferred embodiment, the radial distance between annular surfaces 82 and 83 preferably varies from 0.001 to 0.004 inch corresponding to a leakage or air gap cross-sectional area of 0.01 to 0.04 square inch in 4 inch diameter disks and 0.058 to 0.232 square inches in 20 inch diameter disks.

The radial distance of the air gap in the embodiment of FIG. 3 is important for several reasons. Although it can be larger than the range noted, best results are achieved within that range. In that range, air rushing into the chamber creates a turbulence which effectively blocks any substantial passage of air into the chamber. This enables very quick evacuation of the chamber when the vacuum pump is actuated as by moving of the flapper 42a to the position shown at the right-hand end of FIG. 2. Increased efficiency can be obtained since smaller vacuum pumps can be used insofar as only a small volume of air will enter the chamber from the outside. Since only a small amount of air passes into the chamber and it is effectively blocked due to the turbulence, outside dust, particles and dirt of all kind is prevented from accumulating in the chamber.

Since the size of the gap in the L-shaped cross section annular means is important, it is also important to have a method of forming the gap in the correct size range.

It has been found that when the friction material is formed of conventional friction materials such as brake lining materials and the like which may be of rubber and cork mixtures, the coupling disk itself can be used to form the L shape. The disk being made of a flexible material and normally an aluminum alloy, is substantially harder than the friction material. Even when made as round as high tolerance equipment will allow, its TIR provides an eccentricity of 0.001 in normal procedures.

When a coupling disk is made and positioned in a device as against a friction ring, it can be pulled inwardly at pressure against the friction ring. The disk when rotated burnishes the friction pad and in effect bores a circular recess therein to form the L-shaped cross section. The eccentricity of the disk itself forms the gap and when the disk has an eccentricity of 0.001, a gap of about 0.002 results from the burnishing operation. Such gaps are well within the limitations that provide for blockage of air flow due to turbulence. Thus the method comprises rotating the disk against a flat surface of a friction pad which surface overextends the circumference of the disk while applying a force to the disk so as to wear a recess in the disk and form a leakage gap in accordance with this invention. In a preferred embodiment a 9.000 inch diameter disk is pulled against an 8.995 inch inner diameter friction ring at a vacuum of 4 inches Hg while rotating at 200 rpm. In 4 minutes a 0.040 inch deep recess is formed with an air gap between the disk edge and surrounding friction ring wall 82 of 0.002 inch. The disk is finally positioned a greater distance from the surface 84 than 0.002.

While the disk itself is used to form the gap, obviously a tool could also be used of substantially the same size of the disk which tool is later replaced by a disk to be used. It should be noted that the friction material ring to be formed into the L-shaped cross section need not be large. With a coupling disk of for example 14 inches, the friction ring 28 can have an inner diameter of 12.5 inch, an outer diameter of 14.125 inch, and the wall 84 can have an outer diameter of 14.002 inch with a radial length of 0.040 inches. In all cases, the disk flexes to provide coupling with the friction material at a flat surface 84 perpendicular to the axis of the shaft while the gap is provided by annular facing surfaces 82, 83 having a smaller cross-sectional area than the cross-sectional area of the gap between the disk outer annular portion and the friction material wall 84. A specific example of a clutch/brake in accordance with FIG. 3 has an air gap arrangement as just described with coupling surfaces at rest of 0.015 inch and steps 60, 61 and 62 each being about ⅓ the radial distance and having step portion thicknesses of 0.312 inch, 0.190 inch and 0.120 inches. With 20" Hg vacuum a torque of 2112 inch pounds can be developed with coupling inertia 0.38 lb.ft.$^2$ and a response time of 14 milliseconds from electronic command to 100% torque. A repeat accuracy of ±500 microseconds is easily obtained.

It should be understood that the L-shaped gap is useful with thin disks in accordance with the prior art such as disks having overall thicknesses of approximately 0.032 inches as well as with the stepped disks of the preferred embodiment of this invention. Similarly the stepped disks of this invention can be used with friction rings in accordance with the known friction rings as well as those of FIG. 3.

While specific embodiments of the present invention have been shown and described, many variations are possible. For example in the embodiment of FIG. 3, while an annular gap of constant value over the lifetime of the device is provided by an L-shaped cross section depression or annular ring formed in the friction material, it is obvious that the annular portion 81 can be formed independently of the friction material by other means. For example, a steel ring could be bound to or inset in the friction material surrounding the disk to provide an annular gap. Other materials could also be used. It is only important that the coupling disk when flexed contact a friction material at a first surface with the gap between said disk and surface in the rest position larger than an annular gap cross-sectional area of predetermined value surrounding the peripheral edge of the disk. No contact is made between the disk edge and the surrounding annular member during usage of the device. This maintains the leakage gap at a preset value.

While a clutch-brake combination has been shown and described, the improved disk and/or improved L-shaped friction ring arrangement can be used in clutches alone or brakes alone. Electromagnetic actuated vacuum devices of all kinds can be used for coupling and uncoupling the disks and friction rings of this invention.

While improvements are described for use in a vacuum-operated device, in some cases, the device can be air pressure actuated. Pressure actuated disks of stepped construction as now claimed as well as gaps provided by non-contacting surfaces to permit fluid passage to on-off conditions are advantageous.

What is claimed is:

1. An intermittent motion device for acting with rotational movement of a shaft and having a housing with said shaft passing through said housing said shaft carrying a coupling disk fixedly mounted thereon with the disk comprising a resilient material capable of elastically deflecting under a force created by fluid pressure, a wall carrying a friction ring means spaced from the disk and defining a chamber on one side of the disk with the chamber being open to the atmosphere in one position of the disk and means for changing the fluid pressure in said chamber to cause said disk to flex whereby said last-mentioned means causes engagement or disengagement of an outer annular ring portion of said disk with a coupling surface of said friction ring means to couple said shaft to said wall, said disk being stepped and varying in thickness at each step radially of a central portion thereof to said annular ring portion whereby said outer annular ring portion flexes to a greater degree than other portions of said disk under pressure, said friction ring means defining an L-shaped annular recess further defining a first friction ring annular wall extending coaxially of the axis of said shaft with a second annular ring wall transverse to the axis of said shaft acting as said coupling surface, said coupling disk being mounted so as to flex within said recess and engage said coupling surface without engaging said first friction ring annular wall, said disk having an outer edge spaced from said first friction ring annular wall by a predetermined amount which remains constant over long periods of use to provide a constant gap for fluid flow.

2. An intermittent motion device in accordance with claim 1 wherein said disk outer annular ring portion has a thickness in the range of from 0.187 to 0.030 inch with said disk having a diameter of from 4 to 24 inches.

3. An intermittent motion device in accordance with claim 1 wherein said friction ring means is integrally formed of friction material and said disk defines a vacuum chamber with a portion of said housing.

4. An intermittent motion device in accordance with claim 1 wherein said gap has a radial extent of from about 0.001 to about 0.004 inch.

5. An intermittent motion device for acting with rotational movement of a shaft and having a housing with said shaft passing through said housing, said shaft carrying a coupling disk fixedly mounted thereon with the disk comprising a resilient metal material capable of elastically deflecting under a force created by fluid pressure, a wall carrying a friction ring means spaced from the disk and defining a vacuum chamber on one side of the disk with the chamber being open to the atmosphere in one position of the disk and means for changing the fluid pressure in said chamber to cause said disk to flex whereby said last-mentioned means causes engagement or disengagement of an annular outer ring portion of said disk with a coupling surface of said friction ring means to couple said shaft to said wall, said friction ring means defining an annular recess further defining a first friction ring annular wall extending coaxially of the axis of said shaft and a second annular ring wall acting as said coupling surface, said coupling disk being mounted so as to flex within said recess and engage said coupling surface without engaging said first friction ring annular wall, said disk having an outer edge spaced from said first friction ring annular wall by a predetermined amount which remains constant over long periods of use to provide a constant gap for fluid flow.

6. An intermittent motion device in accordance with claim 5 and further comprising said gap being annular and defining a radial space of from about 0.001 to about 0.004 inches.

* * * * *